No. 608,356. Patented Aug. 2, 1898.
W. WELLSTOOD, Jr. & A. B. WELLSTOOD.
COMBINED PICTURE AND MIRROR.
(Application filed Nov. 22, 1897.)
(No Model.)
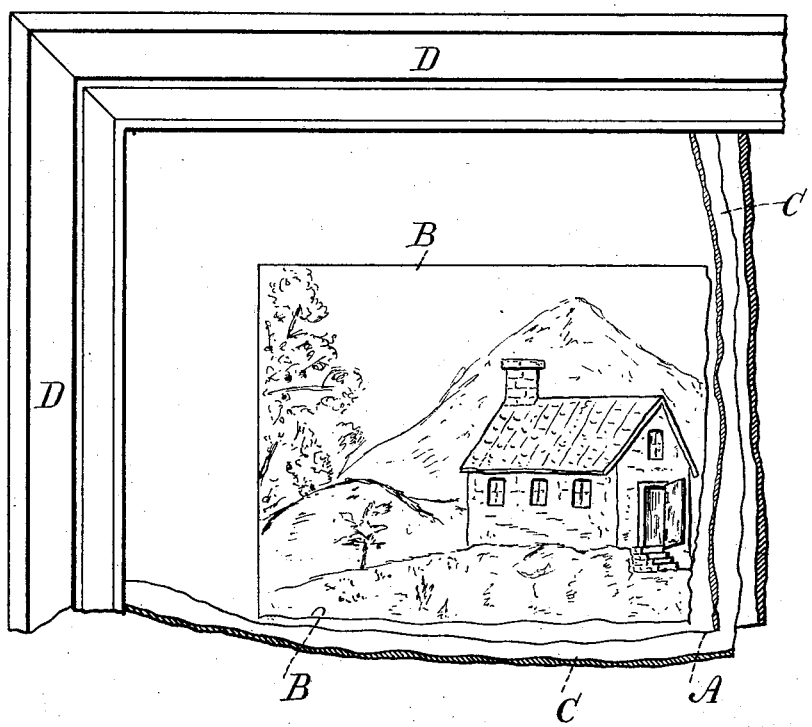
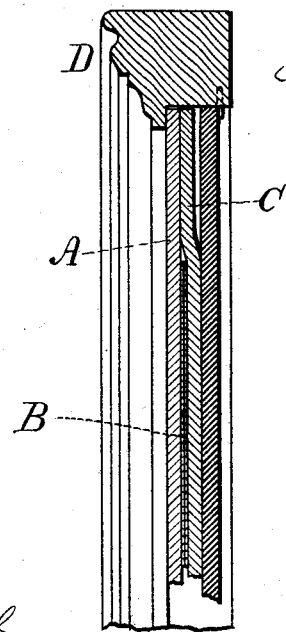

UNITED STATES PATENT OFFICE.

WILLIAM WELLSTOOD, JR., AND ANDREW B. WELLSTOOD, OF NEW YORK, N. Y.

COMBINED PICTURE AND MIRROR.

SPECIFICATION forming part of Letters Patent No. 608,356, dated August 2, 1898.

Application filed November 22, 1897. Serial No. 659,412. (No model.)

*To all whom it may concern:*

Be it known that we, WILLIAM WELLSTOOD, Jr., and ANDREW B. WELLSTOOD, citizens of the United States, residing at New York, (Brooklyn,) in the county of Kings and State of New York, have invented a Combined Picture and Mirror, of which the following is a specification.

The present invention relates to a new article of manufacture in which the pleasing and artistic effect of a picture is combined with a mirror sufficiently perfect for ordinary domestic uses, so that this article is well adapted to general sale or as presents especially adapted to be given to children.

In carrying out this invention we take a sheet of metal foil, advantageously tin-foil, which, if thick enough, may be used alone, or if not sufficiently strong may receive a backing of paper. The engraved picture is to be printed in suitable varnish or ink upon the surface of the foil. We, however, find that the colors of the ink do not show up to advantage if the printing alone is employed. We therefore cover the printed picture with pulverulent material—such, for instance, as lampblack or dry colors—dusted over the surface of the foil and allowed to remain until the printed picture hardens sufficiently for the pulverulent material to be brushed off or otherwise removed. The surface of the foil is now to be covered with a varnish or adhesive material and the picture applied to the back of a plate of glass and caused to adhere closely thereto, so that no air-bubbles or other imperfections may exist in the union, and the picture may be surrounded by any suitable mount or backing, and the glass is then introduced into a frame with a supporting back of any usual or desired character. In this mode of making the combined mirror and picture the picture is visible as an ornament and the surface of the foil is adapted to act as a reflector or mirror for ordinary purposes.

In some instances it is advantageous to apply the varnish or adhesive material to the surface of the glass; but usually it is best to apply the same to the surface of the foil and picture, care being taken to employ such varnish or adhesive material as will not soften the printed picture or cause the colors thereof to run or blur.

In the drawings we have represented, in Figure 1, a section, and in Fig. 2 a portion, of the surface of the picture and frame.

The glass at A receives upon the back of it the foil at B, having the picture printed upon the surface thereof, and C represents a backing or mount, and D the surrounding frame.

We claim as our invention—

As a new article of manufacture, a combined picture and mirror consisting of metal foil with a picture printed on the surface and caused to adhere by a suitable varnish to the back of a plate of glass, substantially as set forth.

Signed by us this 18th day of November, 1897.

WILLIAM WELLSTOOD, JR.
ANDREW B. WELLSTOOD.

Witnesses:
GEO. T. PINCKNEY,
S. T. HAVILAND.